United States Patent
Dempsey et al.

(10) Patent No.: US 11,673,554 B2
(45) Date of Patent: Jun. 13, 2023

(54) SPEED LIMITING OF VEHICLES EQUIPPED WITH ENGINE BRAKES

(71) Applicant: Cummins Inc., Columbus, IN (US)

(72) Inventors: Daniel Reed Dempsey, Columbus, IN (US); Joseph R. Dynes, Columbus, IN (US); Nathanael G. Long, Avon, IN (US)

(73) Assignee: Cummins Inc., Columbus, IN (US)

( * ) Notice: Subject to any disclaimer, the term of this patent is extended or adjusted under 35 U.S.C. 154(b) by 117 days.

(21) Appl. No.: 17/194,814

(22) Filed: Mar. 8, 2021

(65) Prior Publication Data

US 2021/0188271 A1 Jun. 24, 2021

Related U.S. Application Data

(63) Continuation of application No. 16/562,085, filed on Sep. 5, 2019, now Pat. No. 10,940,862.

(51) Int. Cl.
| | |
|---|---|
| *B60W 50/00* | (2006.01) |
| *B60W 30/18* | (2012.01) |
| *B60W 10/06* | (2006.01) |
| *B60W 10/11* | (2012.01) |

(52) U.S. Cl.
CPC ...... *B60W 30/18136* (2013.01); *B60W 10/06* (2013.01); *B60W 10/11* (2013.01); *B60W 2510/0638* (2013.01); *B60W 2510/0685* (2013.01); *B60W 2510/1005* (2013.01); *B60W 2520/10* (2013.01); *B60W 2552/15* (2020.02); *B60W 2710/06* (2013.01); *B60W 2710/1005* (2013.01); *B60W 2720/10* (2013.01); *B60Y 2300/181* (2013.01)

(58) Field of Classification Search
CPC ............ B60W 10/11; B60W 2552/15; B60W 2510/0638; B60W 2510/0685; B60W 2510/1005; B60W 2520/10; B60W 2710/06; B60W 2710/1005; B60W 2720/10; B60W 50/0097; B60Y 2300/181
See application file for complete search history.

(56) References Cited

U.S. PATENT DOCUMENTS

| | | | |
|---|---|---|---|
| 6,076,898 A | 6/2000 | Ota et al. | |
| 6,349,253 B1 | 2/2002 | Bellinger | |
| 6,671,601 B2 * | 12/2003 | Abiru | F16H 61/66254 477/109 |

(Continued)

FOREIGN PATENT DOCUMENTS

| | | | | |
|---|---|---|---|---|
| JP | 08238952 A | * | 9/1996 | ............. B60K 31/00 |
| WO | WO-2007/042988 | | 4/2007 | |

(Continued)

*Primary Examiner* — Tisha D Lewis
(74) *Attorney, Agent, or Firm* — Foley & Lardner LLP

(57) ABSTRACT

A method of substantially preventing road speed excursions while traversing a road grade includes: determining, by a controller, a predicted over speed for a vehicle during an upcoming downhill grade based on a difference between a predicted engine braking power of the vehicle and an amount of braking power that substantially prevents a speed of the vehicle from exceeding a speed threshold; and responsive to the determination, controlling, by the controller, one or more components of the vehicle to substantially prevent the vehicle from exceeding the speed threshold.

20 Claims, 8 Drawing Sheets

(56) References Cited

U.S. PATENT DOCUMENTS

| | | | |
|---|---|---|---|
| 7,225,073 | B2 | 5/2007 | Hedman et al. |
| 7,873,452 | B2 | 1/2011 | Hawkins et al. |
| 8,068,963 | B2 | 11/2011 | Sugiura et al. |
| 8,700,256 | B2 | 4/2014 | Duraiswamy et al. |
| 8,738,248 | B2 * | 5/2014 | Andrasko ........... B60W 10/198 |
| | | | 180/370 |
| 8,935,068 | B2 | 1/2015 | Kresse et al. |
| 9,020,726 | B2 | 4/2015 | Boeckenhoff et al. |
| 2005/0187694 | A1 | 8/2005 | Shiiba et al. |
| 2007/0219695 | A1 | 9/2007 | Chiu et al. |
| 2016/0332632 | A1 * | 11/2016 | Roos ............... B60W 30/18136 |
| 2018/0031119 | A1 | 2/2018 | Maurer et al. |

FOREIGN PATENT DOCUMENTS

| | | |
|---|---|---|
| WO | WO-2014/149043 A1 | 9/2014 |
| WO | WO-2014/149044 A1 | 9/2014 |
| WO | WO-2018/081062 A1 | 5/2018 |

\* cited by examiner

SPEED LIMITING OF VEHICLES EQUIPPED WITH ENGINE BRAKES

CROSS-REFERENCE TO RELATED APPLICATIONS

This application is a continuation of U.S. patent application Ser. No. 16/562,085, entitled "SPEED LIMITING OF VEHICLES EQUIPPED WITH ENGINE BRAKES," which was filed on Sep. 5, 2019, which is incorporated by reference herein for all purposes.

TECHNICAL FIELD

The present disclosure relates to control strategies for an engine braking system on a vehicle.

BACKGROUND

Engine braking, also referred to as "jake braking," refers to the closed or mostly closed throttle position in petrol engines when an accelerator pedal is released and the opening of an exhaust valve(s) to release and/or redirect compression gases to reduce engine speed. In a vehicle, engine braking may be implemented using an engine braking system, which may be used to reduce the road speed of the vehicle without wearing out other friction-type braking components (e.g., brake drums, discs, etc.) that are located along the vehicle chassis. The amount of power provided by the engine braking system to slow the vehicle may be controlled via the exhaust valve(s), to provide more or less braking when traversing different road grades, while also maximizing operator comfort. However, such engine braking systems traditionally rely on user inputs to determine optimal performance parameters (e.g., when to activate, what braking power to apply, etc.), and do not provide a comprehensive solution to, for example, preventing vehicle road speed excursions on steep grades.

SUMMARY

One embodiment relates to a method. The method includes receiving, by a controller, vehicle operations data regarding operation of a vehicle, where the vehicle operations data includes a current transmission setting. The method additionally includes receiving, by the controller, road grade data regarding an upcoming road grade ahead of the vehicle. The method also includes determining, by the controller, an amount of braking power that substantially prevents the vehicle from exceeding a speed threshold regarding operation of the vehicle based on the road grade data and the vehicle operations data, and also determining an amount of engine braking power based on the current transmission setting. The method further includes controlling, by the controller, a transmission setting in response to a determination that the amount of engine braking power less than the amount of braking power.

Another embodiment relates to a system. The system includes a transmission system structured to modify a transmission setting of a vehicle and an engine braking control circuit. The engine braking control circuit is communicably coupled to the transmission system and is structured to receive vehicle data regarding operation of a vehicle including a current transmission setting, to receive road grade data regarding an upcoming road grade of a path ahead of the vehicle, to determine an amount of braking power that substantially prevents the vehicle from exceeding a speed threshold regarding operation of the vehicle based on the road grade data and the vehicle operations data, to determine an amount of engine braking power based on the current transmission setting, and to control the transmission system to modify a transmission setting in response to a determination that the amount of engine braking power is less than the amount of braking power.

Yet another embodiment relates to an apparatus. The apparatus includes an engine braking control circuit. The engine braking control circuit includes a memory storing machine readable instructions and a processor. The machine readable instructions are structured to cause the processor to perform operations including receiving vehicle operations data regarding operation of a vehicle including as a current transmission setting, receiving road grade data regarding an upcoming road grade of a path ahead of the vehicle, determining an amount of braking power that substantially prevents the vehicle from exceeding a speed threshold regarding operation of the vehicle based on the road grade data and the vehicle operations data, determining an amount of engine braking power based on the current transmission setting, and controlling a transmission setting in response to a determination that the amount of engine braking power is less than the amount of braking power.

These and other features, together with the organization and manner of operation thereof, will become apparent from the following detailed description when taken in conjunction with the accompanying drawings.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

Figure 1:
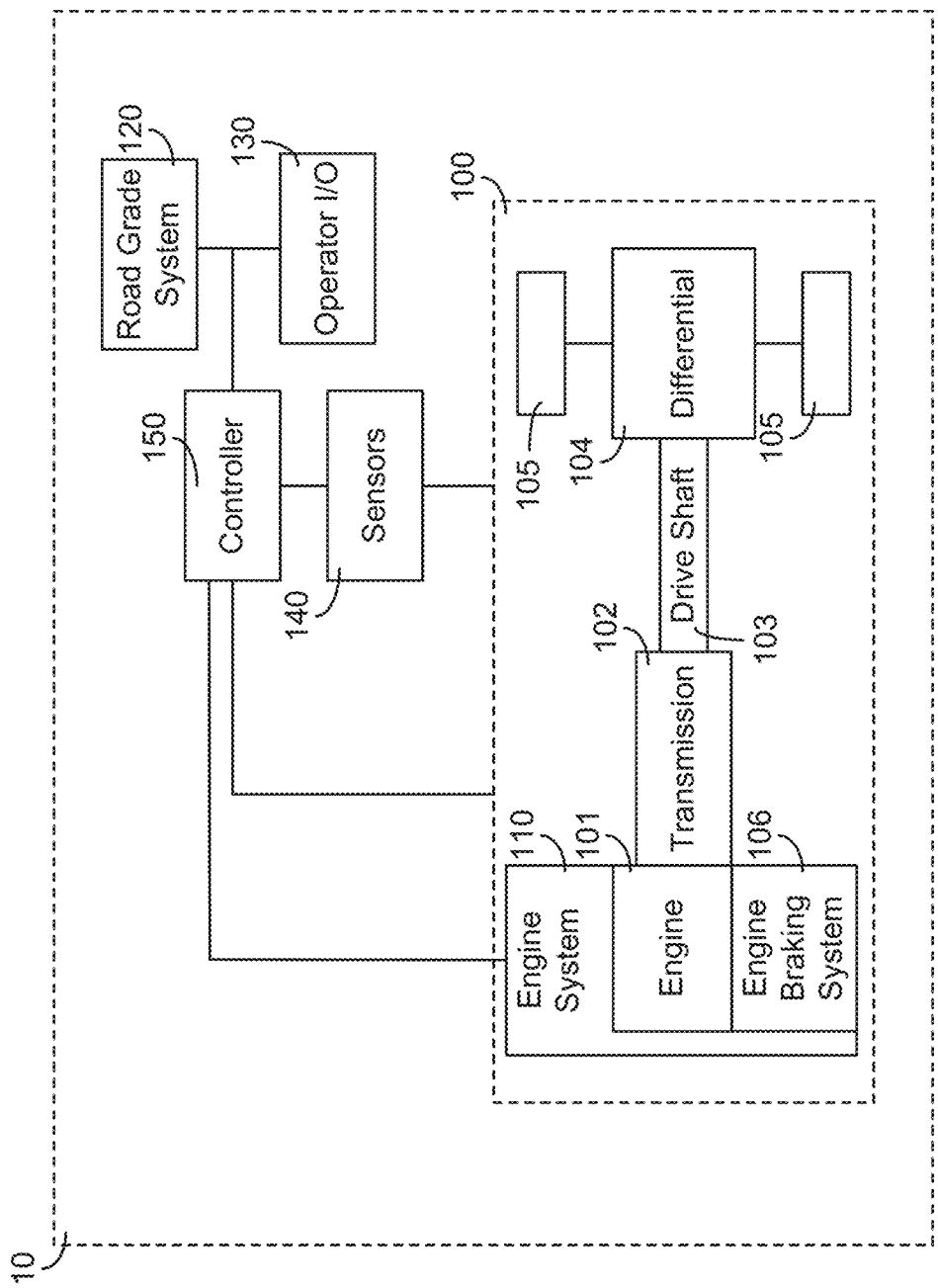
FIG. 1 is a schematic diagram of a vehicle having a controller and an engine braking system, according to an example embodiment.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for controlling an engine braking system of a vehicle. The various concepts introduced above and discussed in greater detail below may be implemented in any number of ways, as the concepts described are not limited to any particular manner of implementation. Examples of specific implementations and applications are provided primarily for illustrative purposes.

Referring generally to the Figures, the various embodiments disclosed herein relate to systems, apparatuses, and methods for controlling an engine braking system of a vehicle. More specifically, embodiments herein relate to controlling an engine braking system using road grade data regarding an upcoming road grade ahead of the vehicle to eliminate or substantially reduce the risk of road speed excursions while traversing the road grade in which the vehicle exceeds a predefined maximum road speed such as a speed limit on a highway, a maximum road speed at which an operator can maintain control over the vehicle, a maximum engine speed beyond which damage to an engine may occur, etc. Existing systems and methods for controlling the road speed of the vehicle while traversing a road grade require manual interaction from an operator of the vehicle, and often require the operator to anticipate how the upcoming road grade will affect the vehicle. The performance of the vehicle while traversing the road grade is therefore based on the skill and experience of the operator. For example, the fuel efficiency of the vehicle will be based on how early the operator releases a throttle pedal before a steep grade (e.g., a hill, etc.), the road speed at which the vehicle enters the steep grade, the transmission setting (e.g., gear ratio) selected by the operator, the amount of braking applied while traversing the steep grade (e.g., by friction brakes on the vehicle chassis), among other factors. The maximum road speed achieved by the vehicle while traversing the steep grade will also be a function of operator skill and experience.

A system according to the present disclosure includes a transmission system structured to modify a transmission setting of a vehicle and an engine braking control unit. The transmission system may include a transmission for a vehicle structured to transfer engine power to a vehicle chassis (e.g., driveshaft, wheels, etc.). The engine braking control unit is coupled to the transmission system and is configured to send control signals to the transmission system; for example, in order to shift a transmission gear ratio (or, setting) of the transmission system. The engine braking control unit is structured to receive vehicle operations data regarding operation of a vehicle. The vehicle operations data may include a current transmission gear ratio (e.g., a real-time transmission gear ratio at which the vehicle is operating). Additionally, the engine braking control unit is structured to receive road grade data regarding an upcoming road grade ahead of the vehicle (e.g., a road grade of a hill or slope in front of the vehicle). The engine braking control unit is structured to determine an amount of braking power that is needed or likely needed to substantially prevent the vehicle from exceeding a speed threshold while traveling along (e.g., traversing) the road grade (e.g., to substantially prevent the vehicle from over accelerating beyond a predefined acceleration amount while traversing a grade, a required or likely required amount of braking power that is needed to reduce the acceleration of the vehicle to 0 m/s² at some point while traversing the road grade based on the road grade data and the vehicle operations data, etc.). In particular, the engine braking control unit is structured to determine an amount of braking power that is needed or likely needed to prevent the vehicle from exceeding a predefined road speed (e.g., linear speed in miles per hour, kilometers per hour, etc.) while traversing a grade. The amount of braking power that prevents or likely prevents the vehicle from exceeding a predefined road speed may also be referred to herein as the required amount of braking power. The engine braking control unit is also structured to determine an amount of engine braking power that can be provided by an engine of the vehicle using the current transmission gear ratio. The engine braking power is indicative of an amount of power that can be produced by an engine braking system with based on various exhaust valve timing and/or positioning (e.g., with all of the exhaust valves opening at the end or just before the end of the compression stroke). The engine braking system may be coupled to the engine braking control unit and may be controlled by the engine braking control unit.

The engine braking control unit is further structured to control the transmission system to modify a transmission gear ratio in response to a determination that the amount of engine braking power that can be produced by the vehicle (e.g., by the engine) is less than the required amount of braking power. Among other benefits, selectively shifting the transmission based on real-time road grade data ensures that enough power will be or is likely to be provided by the engine braking system while traversing the road grade to prevent road speed excursions in which the road speed of the vehicle (e.g., in miles-per-hour, kilometers per hour, etc.) increases above a maximum threshold road speed. As used herein, the maximum threshold road speed is a predefined vehicle speed limit beyond which the operator does not desire to operate. The maximum threshold road speed may be a speed limit on a highway, a maximum road speed at which an operator can maintain control over the vehicle, a maximum engine speed beyond which damage to an engine may occur, etc.

In some embodiments, the engine braking control unit is structured to determine a predicted engine braking power that can be achieved at the current transmission gear ratio and/or any number of additional gear ratios having a lower or higher gear number than the current transmission gear ratio. The engine braking control unit may be structured to compare the predicted engine braking power at each transmission gear ratio or setting to the required amount of braking power and take one or more remedial actions (e.g., to adjust the transmission gear ratio) so that the predicted engine braking power is equal to or exceeds the required amount of braking power that prevents over acceleration of the vehicle while traversing the road grade, such as the downward sloped portion of a hill. In a scenario where the predicted engine braking power that can be provided over the range of different transmission gear ratios is less than the required amount of braking power, the engine braking control unit is structured to engage the engine braking system to reduce the road speed of the vehicle in advance of the upcoming road grade and thereby reduce the engine speed at which the vehicle enters the grade, such that the combined braking energy provided while traversing the grade is sufficient to prevent road speed excursions. In other embodiments, the engine control unit may deem it sufficient to disengage cruise control of the vehicle, and/or reduce fueling to the engine such that the vehicle may coast to a lower road speed before entering the grade.

The engine braking control unit may further be structured to control the engine braking system to improve overall fuel efficiency for the engine. For example, the engine braking control unit may determine, based on the road grade data and vehicle operations data, that the road grade at a predetermined point ahead of the vehicle is gradual enough to allow the vehicle to continue decelerating, and/or to prevent further acceleration of the vehicle while traversing the road grade. Under these conditions, the engine braking control unit may be structured to reduce and/or disable the engine braking system while traversing the remaining grade to thereby conserve the kinetic energy of the vehicle. In some embodiments, the engine braking control unit may be structured to shift the transmission to a gear ratio that has a higher gear number than the current transmission gear ratio to further improve fuel economy. Among other benefits, reducing and/or disabling the engine braking system before leaving (e.g., exiting) the road grade improves the overall fuel efficiency of the engine (due to the conserved kinetic energy of the vehicle). These and other advantageous features will become apparent to those reviewing the present disclosure and figures.

Referring now to FIG. 1, a schematic diagram of a vehicle 10 with a controller 150 is shown according to an example embodiment. As shown in FIG. 1, the vehicle 10 generally includes a powertrain 100, a road grade system 120, an operator input/output (I/O) device 130, sensors 140 communicably coupled to one or more components of the vehicle 10, and a controller 150. These components are described more fully herein. The vehicle 10 may be a commercial on-road vehicle including, but not limited to, a line haul truck (e.g., a semi-truck), a medium or light duty vehicle (e.g., a schoolbus, a garbage truck), or any other type of machine or vehicle suitable for the systems described herein. Thus, the present disclosure is applicable with a wide variety of implementations.

Components of the vehicle 10 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 150 is communicably coupled to the systems and components in the vehicle 10 of FIG. 1, the controller 150 is structured to receive data regarding one or more of the components shown in FIG. 1. For example, the data may include operation data regarding the operating conditions of the powertrain 100 and/or other components (e.g., an engine, the operator I/O device 130, etc.) acquired by one or more sensors, such as sensors 140. As another example, the data may include an input from operator I/O device 130. The controller 150 may determine how to control the powertrain 100 based on the operation data.

As shown in FIG. 1, the powertrain 100 includes an engine system 110, a transmission 102, a driveshaft 103, a differential 104, and a final drive 105. The engine system 110 includes an engine 101, which may be structured as a variety of different engine types, including a spark-ignition internal combustion engine or a compression-ignition internal combustion engine. The engine 101 may be powered by diesel, ethanol, gasoline, natural gas, propane, hydrogen, or another petroleum-based fuel type. The engine system 110 also includes an engine braking system 106, which may be structured as any type of energy braking mechanism for the engine 101. For example, the engine braking system 106 may be a compression release engine brake that selectively activates an exhaust valve(s) to release compression gases from an engine cylinder of the engine at the end of the compression stroke (or at some other point during the compression stroke). The engine braking system 106 may be structured to vary an amount of braking power that is provided to the engine 101 (and, correspondingly, the vehicle 10) by controlling the timing of exhaust valves during the compression stroke.

The transmission 102 may be structured to transmit power from the engine 101 to the driveshaft 103. The transmission 102 includes multiple transmission settings (e.g., gears) that enable the rotational speed of the engine 101 to be modified relative to the road speed of the vehicle 10 (e.g., relative to the rotational speed of the driveshaft 103, etc.), such as to modify the torque provided by the engine 101, through the driveshaft 103 and the differential 104, to the final drive 105. As will be used herein, each transmission setting is associated with a transmission setting number. The lower the transmission setting number, the higher the ratio of the engine operating speed to the driveshaft speed. In other words, the lower the transmission setting number, the greater the braking power that can be produced by the engine braking system 106. The transmission 102 may be a manual transmission, an automatic transmission, a continuously variable transmission, or some combination thereof.

Like the engine 101 and the transmission 102, the driveshaft 103, the differential 104, and/or the final drive 105 may be structured in any configuration dependent on the application (e.g., the final drive 105 is structured as wheels, etc.). Further, the driveshaft 103 may be structured as any type of driveshaft including, but not limited to, a one-piece, two-piece, and a slip-in-tube driveshaft based on the application.

According to an example embodiment, the engine 101 receives a chemical energy input (e.g., a fuel such as gasoline, diesel, etc.) and combusts the fuel to generate mechanical energy, in the form of a rotating crankshaft. The transmission 102 receives the rotating crankshaft and manipulates the speed of the crankshaft (e.g., the engine revolutions-per-minute (RPM), etc.) to affect a desired driveshaft speed. The rotating driveshaft 103 is received by the differential 104, which provides the rotation energy of the driveshaft 103 to the final drive 105. The final drive 105 then propels or moves the vehicle 10.

Referring back to FIG. 1, the operator I/O device 130 may enable an operator of the vehicle 10 to communicate with the vehicle 10 and the controller 150. By way of example, the operator I/O device 130 may include, but is not limited to, an interactive display, a touchscreen device, one or more buttons and switches, voice command receivers, and the like. In one embodiment, the operator I/O device 130 includes a brake pedal or lever, an accelerator pedal or throttle, and selector buttons (not shown) structured to allow an operator to modify cruise control settings/parameters for the vehicle 10 as will be further described.

The sensors 140 may include sensors positioned and/or structured to determine operating characteristics of various components of the vehicle 10 and to output vehicle operations data regarding operation of the vehicle 10 to the controller 150. By way of example, the sensors 140 may include a speed sensor structured to facilitate monitoring the speed of the vehicle 10 and/or the engine 101. The sensors 140 may additionally or alternatively include sensors structured to facilitate monitoring a torque and/or power output of engine 101. The sensors 140 may additionally or alternatively include sensors structured to facilitate monitoring a current transmission setting (e.g., a real-time transmission gear ratio, or gear selection) of the transmission 102.

The road grade system 120 is structured to receive and/or determine road grade data about an upcoming road grade ahead of the vehicle (e.g., in a path or roadway along which the vehicle 10 is traveling). The road grade data may include information regarding road function class (e.g., freeway/interstate, arterial roads, collectors, local roads, unclassified roads, etc.), speed limits, road slope, road curvature, number of lanes, and the like. Additionally, the road grade data may include road condition data indicative of road surface conditions (e.g., wet, icy, snowy, dry, etc.). The road grade system 120 may include or be a global positioning system (GPS), a telematics system, or another route look-ahead system. For example, the road grade system 120 may include a GPS structured to (i) receive information regarding a current location and a desired destination of the vehicle 10, and (ii) generate GPS data that facilitates determining one or more routes from the current location and the desired destination. In another example, the road grade system 120 may include a telematics system that is structured to receive data from a fleet monitoring and control service (e.g. a remote facility that continuously tracks a position of the vehicle 10, and/or directs vehicle 10 operations). In some embodiments, a route of the vehicle 10 is predicted by extrapolating a current location of the vehicle 10 (e.g., via GPS or information from a telematics system) relative a finite distance ahead of the vehicle 10 (e.g., the system assumes the vehicle 10 will continue traveling on the road the vehicle 10 is currently on if there are no roads to turn onto for X distance). Although the embodiments described herein utilize GPS or telematics for the purpose of determining road grade data, it should be understood that other systems may be used according to other example embodiments, and all such implementations are intended to be encompassed herein. In other words, while GPS and telematics systems such as those described herein are efficacious for the purpose of predicting an upcoming road grade ahead of the vehicle 10, other systems, whether now known or hereafter developed, may be used in a similar manner.

As the components of FIG. 1 are shown to be embodied in the vehicle 10, the controller 150 may be structured as one or more electronic control units (ECUs). As such, the controller 150 may be separate from or included with at least one of an engine control unit, an engine braking control unit, a transmission control unit, a powertrain control unit, etc. The function and structure of the controller 150 is described in greater detail with regards to FIG. 2.

Figure 2:
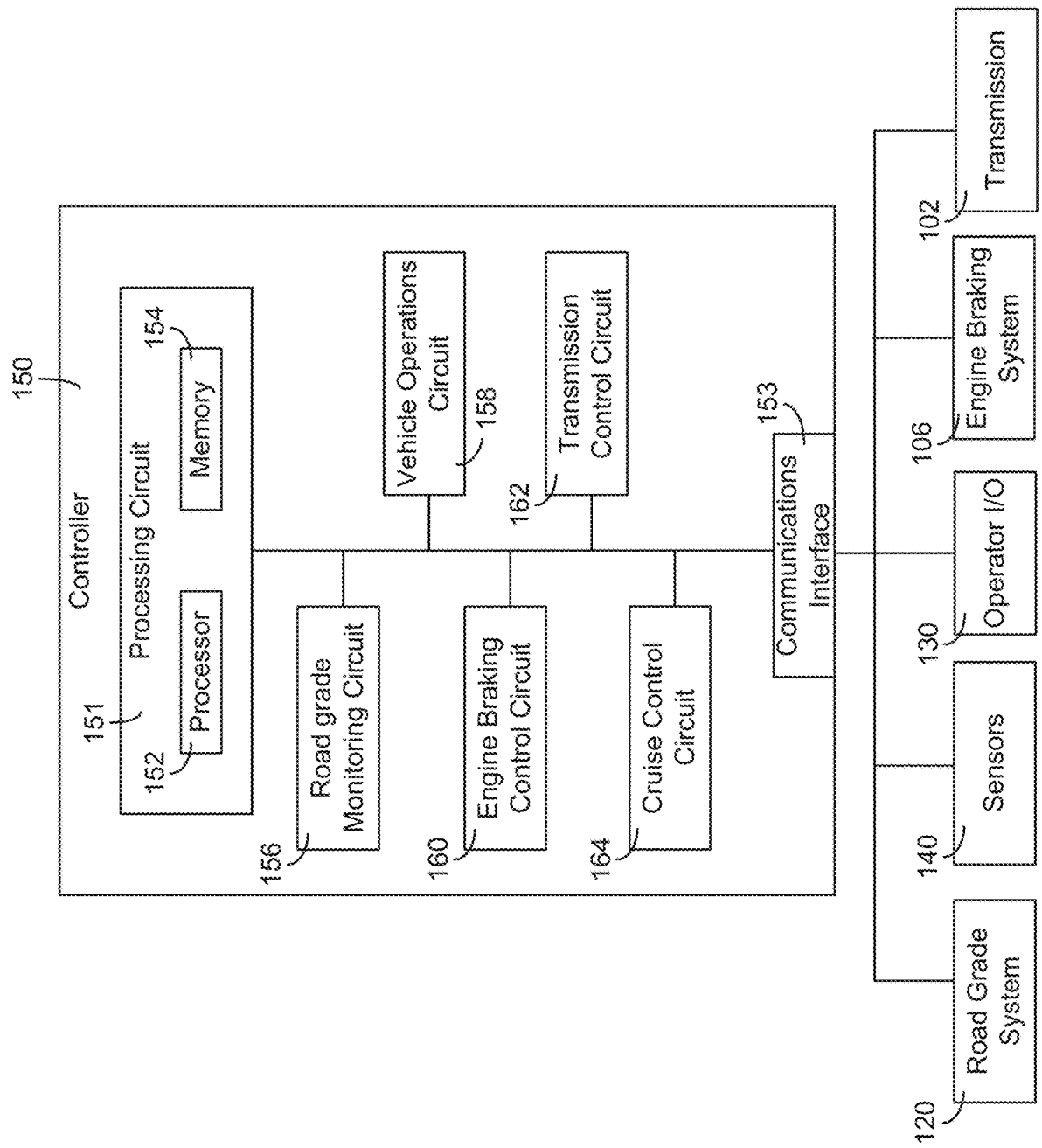
FIG. 2 is a schematic diagram of the controller of the vehicle of FIG. 1, according to an example embodiment.

Referring now to FIG. 2, a schematic diagram of an engine braking control unit (shown as controller 150) of the vehicle 10 of FIG. 1 is shown according to an example embodiment. As shown in FIG. 2, the controller 150 includes a processing circuit 151 having a processor 152 and a memory 154; a road grade monitoring circuit 156; a vehicle operations circuit 158; an engine braking control circuit 160; a transmission control circuit 162, a cruise control circuit 164, and a communications interface 153. As described herein, the controller 150 is structured to (i) prevent the road speed of the vehicle from exceeding a maximum threshold road speed that is indicative of a predefined vehicle speed limit while traversing a road grade (e.g., a hill, a steep slope, etc.) and (ii) to optimize or at least improve upon a would-be expected fuel economy of the vehicle while traversing a road grade.

In one configuration, the road grade monitoring circuit 156, the vehicle operations circuit 158, the engine braking control circuit 160, the transmission control circuit 162, and/or the cruise control circuit 164 are embodied as machine or computer-readable media that is executable by a processor, such as the processor 152. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the road grade monitoring circuit 156, the vehicle operations circuit 158, the engine braking control circuit 160, the transmission control circuit 162, and/or the cruise control circuit 164 are embodied as hardware units, such as electronic control units. As such, the road grade monitoring circuit 156, the vehicle operations circuit 158, the engine braking control circuit 160, the transmission control circuit 162, and/or the cruise control circuit 164 may be embodied as one or more circuitry components including, but not limited to, processing circuitry, network interfaces, peripheral devices, input devices, output devices, sensors, etc. In some embodiments, the road grade monitoring circuit 156, the vehicle operations circuit 158, the engine braking control circuit 160, the transmission control circuit 162, and/or the cruise control circuit 164 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the road grade monitoring circuit 156, the vehicle operations circuit 158, the engine braking control circuit 160, the transmission control circuit 162, and/or the cruise control circuit 164 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, the road grade monitoring circuit 156, the vehicle operations circuit 158, the engine braking control circuit 160, the transmission control circuit 162, and/or the cruise control circuit 164 may also include programmable hardware devices such as field programmable gate arrays, programmable array logic, programmable logic devices or the like. In this regard, the road grade monitoring circuit 156, the vehicle operations circuit 158, the engine braking control circuit 160, the transmission control circuit 162, and/or the cruise control circuit 164 may include one or more memory devices for storing instructions that are executable by the processor(s) of the road grade monitoring circuit 156, the vehicle operations circuit 158, the engine braking control circuit 160, the transmission control circuit 162, and/or the cruise control circuit 164. The one or more memory devices and processor(s) may have the same definition as provided below with respect to the memory 154 and the processor 152. Thus, in this hardware unit configuration, the road grade monitoring circuit 156, the vehicle operations circuit 158, the engine braking control circuit 160, the transmission control circuit 162, and/or the cruise control circuit 164 may be geographically dispersed throughout separate locations in the vehicle 10 (e.g., separate control units, etc.). Alternatively, and as shown, the road grade monitoring circuit 156, the vehicle operations circuit 158, the engine braking control circuit 160, the transmission control circuit 162, and/or the cruise control circuit 164 may be embodied in or within a single unit/housing, which is shown as the controller 150.

In the example shown, the controller 150 includes the processing circuit 151 having the processor 152 and the memory 154. The processing circuit 151 may be structured or configured to execute or implement the instructions, commands, and/or control processes described herein with respect to the road grade monitoring circuit 156, the vehicle operations circuit 158, the engine braking control circuit 160, the transmission control circuit 162, and/or the cruise control circuit 164. Thus, the depicted configuration represents the aforementioned arrangement where the road grade monitoring circuit 156, the vehicle operations circuit 158, the engine braking control circuit 160, the transmission control circuit 162, and/or the cruise control circuit 164 are embodied as machine or computer-readable media. However, as mentioned above, this illustration is not meant to be limiting as the present disclosure contemplates other embodiments such as the aforementioned embodiment where the road grade monitoring circuit 156, the vehicle operations circuit 158, the engine braking control circuit 160, the transmission control circuit 162, and/or the cruise control circuit 164, or at least one circuit of the road grade monitoring circuit 156, the vehicle operations circuit 158, the engine braking control circuit 160, the transmission control circuit 162, and the cruise control circuit 164, are configured as a hardware unit. All such combinations and variations are intended to fall within the scope of the present disclosure.

The processor 152 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the road grade monitoring circuit 156, the vehicle operations circuit 158, the engine braking control circuit 160, the transmission control circuit 162, and/or the cruise control circuit 164 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 154 (e.g., RAM, ROM, Flash Memory, hard disk storage, etc.) may store data and/or computer code for facilitating the various processes described herein. The memory 154 may be communicably connected to the processor 152 to provide computer code or instructions to the processor 152 for executing at least some of the processes described herein. Moreover, the memory 154 may be or include tangible, non-transient volatile memory or non-volatile memory. Accordingly, the memory 154 may include database components, object code components, script components, or any other type of information structure for supporting the various activities and information structures described herein.

The communications interface 153 may include wired and/or wireless interfaces (e.g., jacks, antennas, transmitters, receivers, transceivers, wire terminals, etc.) for conducting data communications with various systems, devices, or networks. For example, the communications interface 153 may include an Ethernet card and port for sending and receiving data via an Ethernet-based communications network and/or a Wi-Fi transceiver for communicating via a wireless communications network. The communications interface 153 may be structured to communicate via local area networks or wide area networks (e.g., the Internet, etc.) and may use a variety of communications protocols (e.g., IP, local operating network (LON), controller area network (CAN), J1939, local interconnect network (LIN), Bluetooth, ZigBee, radio, cellular, near field communication, etc.).

The communications interface 153 of the controller 150 may facilitate communication between and among the controller 150 and one or more components of the vehicle 10 (e.g., components of the powertrain 100, the road grade system 120, the operator I/O device 130, the sensors 140, etc.). Communication between and among the controller 150 and the components of the vehicle 10 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a CAN bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The road grade monitoring circuit 156 is structured to receive road grade data regarding an upcoming road grade ahead of the vehicle 10 (see also FIG. 1) from the road grade system 120. For example, the road grade monitoring circuit 156 may be structured to receive and interpret GPS coordinates from a GPS device and/or vehicle location from a telematics device. The road grade monitoring circuit 156 may be structured to access road grade data regarding the grade, slope, incline, decline, pitch, and/or rise of an upcoming road (e.g., highway, freeway, interstate, etc.) a predefined distance ahead of the vehicle 10 (and behind the vehicle 10) based on the location of the vehicle 10. For example, the road grade monitoring circuit 156 may be structured to access road grade data stored in memory 154 by querying the GPS coordinates of the vehicle 10 and the direction of travel of the vehicle 10 (e.g., determined based on a change in position of the vehicle 10 over a predefined time interval). In another example, the road grade monitoring circuit 156 may be structured to access road grade data directly from the GPS and/or telematics device. In yet other examples, the road grade monitoring circuit 156 may be structured to access road grade data over the internet via highway and road grade data maps and services that are available online (e.g., via a wireless network interface). The road grade monitoring circuit 156 may be structured to populate a look-up table including a list of distances from the current vehicle location and a corresponding list of road grades at each distance. In other embodiments, the road grade monitoring circuit 156 may be structured to determine a functional relationship (e.g., an algorithm, an equation) between vehicle location and road grade.

The road grade monitoring circuit 156 may also be structured to determine road grade events from the road grade data. The road grade events is indicative of a single downward slope extending from a first elevation to a second elevation that is below the first elevation. For example, the road grade monitoring circuit 156 may be structured to analyze a look-up table by grouping together sets of road grade data within a given distance/span that each indicate a negative road grade (e.g., a decreasing or increasing slope, pitch, etc.) and to isolate sections of roadway ahead of the vehicle 10 into, for example, a first road grade event, a second grade event, and so on.

The vehicle operations circuit 158 is structured to receive vehicle operations data regarding operation of the vehicle 10; for example, from the sensors 140, the operator I/O 130, the transmission 102, and/or other vehicle subsystems. The vehicle operations data includes operating parameters. The operating parameters may be relevant to the determination of a vehicle's momentum, braking power, and/or a braking energy required to reduce the acceleration of the vehicle 10 to a predefined acceleration amount to prevent the vehicle 10 from over accelerating while traversing the upcoming road grade. In one embodiment, the predefined acceleration amount is 0 m/s$^2$. In another embodiment, the predefined acceleration amount is a different value that may be set by an operator of the vehicle such as 0.5 m/s$^2$, etc. Thus, the predefined acceleration amount may be variable: change with time; change as function of vehicle road speed (for example, the faster the vehicle, the greater the predefined amount; the slower the vehicle, the lower the predefined amount); change as a function of engine speed; etc.). The vehicle operations data may include a current transmission setting selection for the vehicle 10 based on operating data from the transmission 102 (e.g., a control signal from the transmission 102 that is indicative of a transmission setting number) and/or sensors 140. In an automatic or manual transmission, the current transmission setting may be a gear number and/or gear ratio. Other operations data from the sensors 140 may include, for example, a current road speed of the vehicle 10 (e.g., a real-time road speed in miles-per-hour), and engine operating speed (RPM), an engine operating torque, a current acceleration of the vehicle 10 (e.g., based on multiple road speed measurements over time up to an including a current time), and/or any other vehicle operation parameter. Operations data from the operator I/O 130 may include, for example, the gross vehicle weight rating (GVWR), a weight of the vehicle 10, a weight of any load carried by the vehicle 10, cargo dimensions (e.g., for surface area and/or aerodynamic drag calculations by the engine braking control circuit 160), loss factors for the powertrain 100, a maximum allowable engine operating speed, and the like.

Vehicle operations data may also include performance thresholds that are specified by the operator, pre-programmed, and/or a combination thereof. For example, the vehicle operations data may include cruise control parameters received from the cruise control circuit 164 such as a desired cruise control speed, cruise control droop settings, a maximum threshold road speed for the vehicle 10, a maximum threshold engine speed regarding a predefined engine speed limit, and any other operator specified parameters.

Vehicle operations data may further include experimental data for a variety of engine-transmission configurations such as relationships between road speed and engine operating speed (e.g., RPM) for each of the transmission setting number (e.g., gear number, gear ratio, etc.) of transmission 102. Vehicle operations data may also include relationships between the engine braking power that can be provided by the engine braking system 106 at a given transmission setting and at least one of the road speed and/or engine operating speed. For example, the engine braking power data may be stored in controller memory 154 in the form of a series of engine braking power versus speed curves that are derived from experimental data, or in the form of look-up tables that each correspond with a different transmission gear ratio. For example, a manufacturer may operate the vehicle on a dynamometer to measure the engine braking power that can be provided at various transmission gear numbers or settings over a range of different road speeds to generate the look-up table or a plot of engine braking power versus road speed. These tests may be performed at a fixed exhaust valve timing for the engine braking system (e.g., with each exhaust valve fully open (or at a different amount) at the end of each compression stroke to maximize engine braking power). The manufacturer may repeat these test using different exhaust valve settings for the engine braking system to obtain a more comprehensive understanding of the tradeoffs in engine braking power that can be achieved by the engine braking system at different transmission gear ratios or settings.

As described herein, the engine braking control circuit 160 is structured determine an amount of braking power that substantially prevents the vehicle from exceeding a speed threshold regarding operation of the vehicle based on the road grade data and the vehicle operations data. In some embodiments, the speed threshold is a maximum road speed threshold (e.g., in miles-per-hour, kilometers per hour, etc.) such as a speed limit on a highway, a maximum road speed at which an operator can maintain control over the vehicle, etc. In other embodiments, the speed threshold is a maximum engine operating speed threshold (e.g., RPM) beyond which damage to the engine is likely to occur (i.e., a predefined engine speed limit). In yet other embodiments, the speed threshold is a maximum amount of acceleration based on manufacturer specifications or operator comfort. In yet other embodiments, the speed threshold is a combination of multiple different speed thresholds or a lowest value of a plurality of speed thresholds. In some embodiments, the speed threshold is a predefined value set by a manufacturer. In other embodiments, the speed threshold is set by the operator of the vehicle via the operator I/O (e.g., via cruise control settings, etc.).

The engine braking control circuit 160 is structured to determine one or more braking parameters (e.g., braking energy, the amount of braking power required to prevent road speed excursions, a time at which the engine brakes should be applied in advance of the road grade, etc.) for the vehicle 10 and to implement engine braking functions. As shown in FIG. 2, the engine braking control circuit 160 is coupled to the road grade monitoring circuit 156, the vehicle operations circuit 158, the transmission control circuit 162, and the cruise control circuit 164. The engine braking control circuit 160 is structured to receive road grade data indicative of an upcoming road grade ahead of the vehicle 10 from the road grade monitoring circuit 156. For example, the engine braking control circuit 160 may receive information regarding a distance from a current location of the vehicle 10 (e.g., via one or more look-up tables, based on execution of an algorithm, algorithms from the road grade monitoring circuit 156 that correlate distance with road grade, and/or road grade events, etc.). The engine braking control circuit 160 may be structured to determine a required amount of braking power that prevents the vehicle from exceeding the speed threshold while traversing (e.g., traveling through) each road grade event. In particular, the engine braking control circuit 160 may be structured to determine the required amount of braking power at multiple points in time over a duration of the road grade event to prevent the vehicle 10 from exceeding a maximum threshold road speed (i.e., the speed threshold). The maximum threshold road speed is indicative of a predefined vehicle speed limit. For example, the maximum threshold road speed may be a speed limit on a highway that is entered by a user into a user interface or determined by the look-ahead system (e.g., GPS), a maximum road speed at which an operator can maintain control over the vehicle, etc. In other words, the engine braking control circuit 160 may be structured to determine a maximum amount of braking power that is likely required from the engine braking system to prevent road speed excursions in which the vehicle 10 accelerates above the maximum threshold road speed (i.e., the speed threshold) during the road grade event. The required amount of braking power may be determined by calculating or otherwise determining (e.g., predicting) the powers associated with the vehicle 10 while traversing the road grade event at distinct points in time as will be described with reference to FIG. 3.

Figure 3:
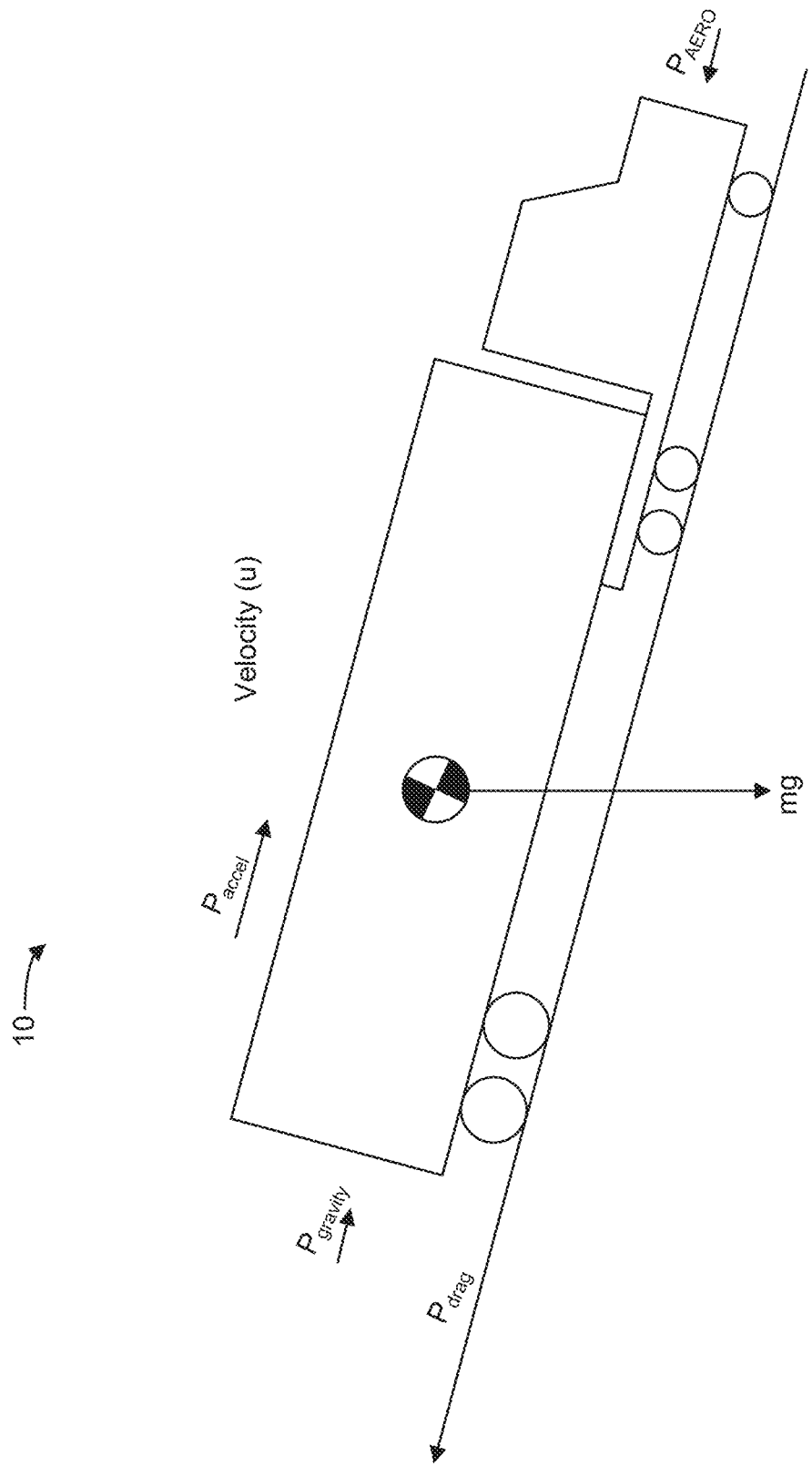
FIG. 3 is a force diagram of the vehicle of FIG. 1, according to an example embodiment.

Referring now to FIG. 3, a schematic of a vehicle, which may be the same or similar to the vehicle 10 of FIG. 1, is shown according to an example embodiment. The schematic indicates the power required to overcome various forces associated with the vehicle 10. The powers associated with the vehicle 10 include, in no particular order, $P_{Aero}$, the power associated with aerodynamic or wind resistance, $P_{Accel}$, which is the power due to the speed of the vehicle entering the road grade event, $P_{Drag}$, which is the power required to overcome the drag of final drive 105 (e.g., wheels), and $P_{Gravity}$, which is the power required to overcome the force of gravity on the vehicle 10. The power may also include a loss term (e.g., power loss) based on powertrain losses between the engine 101 and the final drive 105. The power terms may be determined, at least in part, based on vehicle operations data from the vehicle operations circuit 158 such as a current engine operating speed of the vehicle 10, a weight of the vehicle 10, dimensions of the vehicle 10, etc. The engine braking control circuit 160 may be structured to determine the required braking power by summing the contributions from each of the power terms over the duration of the road grade event (e.g., at distinct time intervals over the duration of the road grade event). These power terms will vary with road speed and with the angle/pitch of roadway along the road grade event such that the required braking power to prevent the vehicle from over accelerating while traversing the road grade will also vary at different points along the road grade event and with the road speed at which the engine brakes are applied. The power terms may be evaluated as part of an algorithm. By way of example, the engine braking control circuit 160 may calculate each of the power terms from the beginning of the road grade event (e.g., at the top of a hill with a 30% negative road grade) to the end of the road grade event in 5 s intervals of time, assuming that no fueling is being applied to the engine while traversing the road grade event. The acceleration of the vehicle at each 5 second interval in time may be calculated based on the net power acting on the vehicle at the previous time interval, the elapsed time, and/or other vehicle operating parameters at the previous time interval. The road speed of the vehicle may also be calculated from these parameters at each 5 second interval of time. The engine braking control circuit 160 may be structured to iteratively vary the braking power applied to slow the vehicle at different time intervals while traversing the road grade until the maximum road speed achieved by the vehicle is approximately equal to or less than the maximum threshold road speed (i.e., the speed threshold).

In some embodiments, the engine braking control circuit 160 may also be structured to determine the total amount of braking energy required to prevent the vehicle 10 from exceeding the maximum threshold road speed (i.e., the speed threshold); for example, by integrating the sum of the power terms over time (e.g., over the duration of the road grade event). Whereas the required braking power is a maximum instantaneous power value (e.g., Watts at one point in time) required to prevent the vehicle 10 from exceeding the maximum threshold road speed, the total amount of braking energy is an overall energy value (e.g., in kilojoules) output by the engine braking system to prevent the vehicle 10 from accelerating beyond the maximum threshold road speed throughout the entire road grade event.

Returning to FIG. 2, the engine braking control circuit 160 may also be structured to determine an amount of braking power that can be provided by the engine braking system 106 at the current transmission gear ratio or setting in combination with an engine speed. For example, the engine braking control circuit 160 determines the maximum amount of braking power that can be provided by accessing one or more look-up tables that provide engine braking performance at various transmission gear ratios or settings. For example, the engine braking control circuit 160 may access a first look-up table that includes engine rotational speeds (e.g., 2000 RPM, 3000 RPM, etc.) as a function of road speed (e.g., speed of the final drive 105 of FIG. 1 in miles per hour) and a second look-up table that includes engine braking powers (e.g., in kW) that correspond with different engine rotational speeds (as determined from the first look-up table). The engine braking control circuit 160 may select the appropriate look-up table based on a comparison between a transmission gear ratio identifier (e.g., a transmission gear number such as 1, 2, 3, 4, and so on that is reported by the vehicle operations circuit 158) and a look-up table number that corresponds with the identifier. In other embodiments, the engine braking control circuit 160 may be structured to evaluate the maximum amount of engine braking power that can be provided at the maximum threshold road speed and/or engine speed using algorithms or curve fits from empirical data received from the vehicle operations circuit 158.

In various example embodiments, the engine braking control circuit 160 may be structured to determine an amount of braking power that can be provided by the engine braking system 106 at transmission gear ratios other than the current transmission gear ratio, and more specifically, in instances where the braking power that can be provided at the current transmission gear ratio is insufficient to prevent road speed excursions while traversing the road grade event. For example, the engine braking control circuit 160 may be structured to determine a predicted engine braking power that can be achieved using a second transmission gear ratio that has a lower gear number than the current transmission ratio. The engine braking control circuit 160 may determine a predicted engine rotational speed at the second transmission ratio based on the current road speed or a predicted road speed while traversing the road grade event. Again, the engine braking control circuit 160 may be structured to determine the predicted engine rotational speed (i.e., a predicted engine speed) by accessing a first lookup table that includes engine rotational speeds (e.g., 2000 RPM, 3000 RPM, etc.) as a function of road speed (e.g., speed of the final drive 105 of FIG. 1 in miles-per-hour) for the second transmission gear ratio. The engine braking control circuit

160 may access a second look-up table that includes engine braking powers (e.g., in kW) that can be achieved at different engine rotational speeds. The engine braking control circuit 160 may be structured to select the engine braking power that can be achieved at the engine rotational speed identified in the first look-up table (e.g., by interpolation or selecting a nearest value that is listed in the look-up table).

In some embodiments, the engine braking control circuit 160 is structured to select a transmission gear ratio that is required or is likely required for traversing the road grade event, such that sufficient power will be provided to prevent road speed excursions while traversing the road grade event without exceeding engine operational limits. For example, the engine braking control circuit 160 may be structured to send a command and/or control signal to the transmission control circuit 162 to shift the transmission gear ratio or setting from the current transmission gear ratio or number to the second transmission gear ratio or number based on a determination that the predicted engine braking power at the second transmission gear ratio is greater than the required amount of braking power and, in certain embodiments, when the predicted engine speed at the second transmission gear ratio is less than a maximum threshold engine speed. In a vehicle equipped with an automatic transmission, the engine braking control circuit 160 may be structured to generate a control signal to cause the transmission to shift to the second transmission gear ratio or number. In a manual transmission, the engine braking control circuit 160 may be structured to generate an alert that notifies the operator to shift. The alert may be a dashboard indicator that illuminates a desired gear number or setting that the operator should shift to.

In some embodiments, the engine braking control circuit 160 may be structured to determine a predicted over speed (e.g., a difference between the predicted maximum road speed and the maximum threshold road speed or difference between the predicted engine speed and the predefined engine speed limit) based on a difference between the predicted engine braking power and the required amount of braking power. For example, the engine braking control circuit 160 may be structured to use the road grade data and vehicle operations data to determine a predicted acceleration of the vehicle 10 at specific time intervals throughout the road grade event in the absence of engine braking power as described above. The engine braking control circuit 160 may be structured to integrate the acceleration data over time to determine an approximate velocity profile of the vehicle 10 while traversing the road grade. The velocity relates directly to the road speed of the vehicle and provides a prediction of whether the vehicle will exceed the maximum threshold road speed while traversing the road grade event. In some embodiments, the engine braking control circuit 160 is structured to apply engine braking power to reduce the acceleration to 0 m/s$^2$ while traversing the road grade to prevent the vehicle from exceeding the maximum threshold road speed. In other embodiments, the engine braking control circuit 160 is structured to apply engine braking power to reduce the acceleration of the vehicle to another predefined acceleration threshold. In some embodiments, the velocity profile data may be used to determine how far in advance of the road grade event (e.g., of the upcoming road grade) to apply engine braking in order to prevent road speed excursions while traversing the road grade event (e.g., by performing another calculation of the over speed for an entry road speed that is less than the current road speed of the vehicle 10 and applying the engine brakes to achieve the entry road speed in advance of the road grade event).

In some embodiments, the engine braking control circuit 160 is structured to use the road grade data and the vehicle operations data to determine a position along the road grade event at which no further engine braking will be required (e.g., a position along the road grade event at which the vehicle 10 may be allowed to coast without exceeding the maximum road speed threshold throughout the remainder of the road grade event). The engine braking control circuit 160 may be structured to disable the engine braking system 106 at this position, which, advantageously, improves fuel efficiency by conserving the momentum of the vehicle 10 below the maximum threshold road speed.

The engine braking control circuit 160 may be structured to apply and/or implement engine braking via the engine braking system 106. The engine braking control circuit 160 may be structured to control a braking power provided by the engine braking system 106 at the current transmission gear ratio by providing a control signal to the engine braking system 106 (e.g., a control signal indicative of a desired braking power). The engine braking system 106, in response to the command and/or control signal, will control an exhaust valve(s) for the engine to achieve the desired braking performance. For example, the engine braking system 106 may modulate exhaust valve timing during each compression stroke of the engine or otherwise modulate an amount of opening of the exhaust valve(s) to control the amount of engine braking power provided by the engine braking system 106 (e.g., opening the valve(s) earlier during the compression stroke to reduce engine braking power vs. opening valve(s) at the end of the compression stroke to maximize engine braking power).

The transmission control circuit 162 is structured to control the transmission 102 in response to commands from the engine braking control circuit 160 and/or to generate alerts to notify the operator to shift the transmission setting. For example, the transmission control circuit 162 may be structured to provide a shift command to the transmission 102 to reduce the transmission gear ratio in response to an indication from the engine braking control circuit 160 that the braking power that can be provided by the engine at the current transmission gear ratio is insufficient to prevent road speed excursions while traversing the road grade event. As another example, when the predicted engine speed is less than a maximum threshold engine speed and the predicted engine braking power is greater than the amount of braking power that substantially prevents the vehicle from exceeding the speed threshold, a shift to reduce the transmission gear ratio occurs. This results in more braking power being provided to reduce a potential speed excursions and, beneficially, engine speeds within desired operational parameters to decrease unwanted stress on the system. The transmission control circuit 162 may also be structured to provide shift commands to the transmission 102 in response to operator commands received from the operator I/O 130.

The cruise control circuit 164 is structured to control fueling (not shown) to the engine while motoring at the current transmission ratio (e.g., with the transmission engaged). The cruise control circuit 164 may also be structured to receive cruise control parameters from the operator I/O 130 such as cruise control droop settings, a road speed governor setting, etc.). According to various example embodiments, the cruise control circuit 164 is structured to receive a cruise control set speed (e.g., an average desired road speed, a target road speed, etc.), a lower droop setting that defines how much the vehicle 10 is allowed to speed up while traversing a downhill grade (e.g., X miles-per-hour above the defined cruise control set speed), an upper droop setting that defines how much the vehicle 10 is allowed to slow down on an uphill grade (e.g., Y miles-per-hour below the cruise control set speed), and a maximum road speed threshold for the vehicle 10 (e.g., a road speed limit, a speed beyond which the operator may lose control of the vehicle 10, etc.). In some embodiments, the lower droop setting may be a road speed threshold beyond which engine braking may be applied (e.g., to prevent road excursions beyond a maximum speed threshold while traversing the road grade event).

Figure 4:
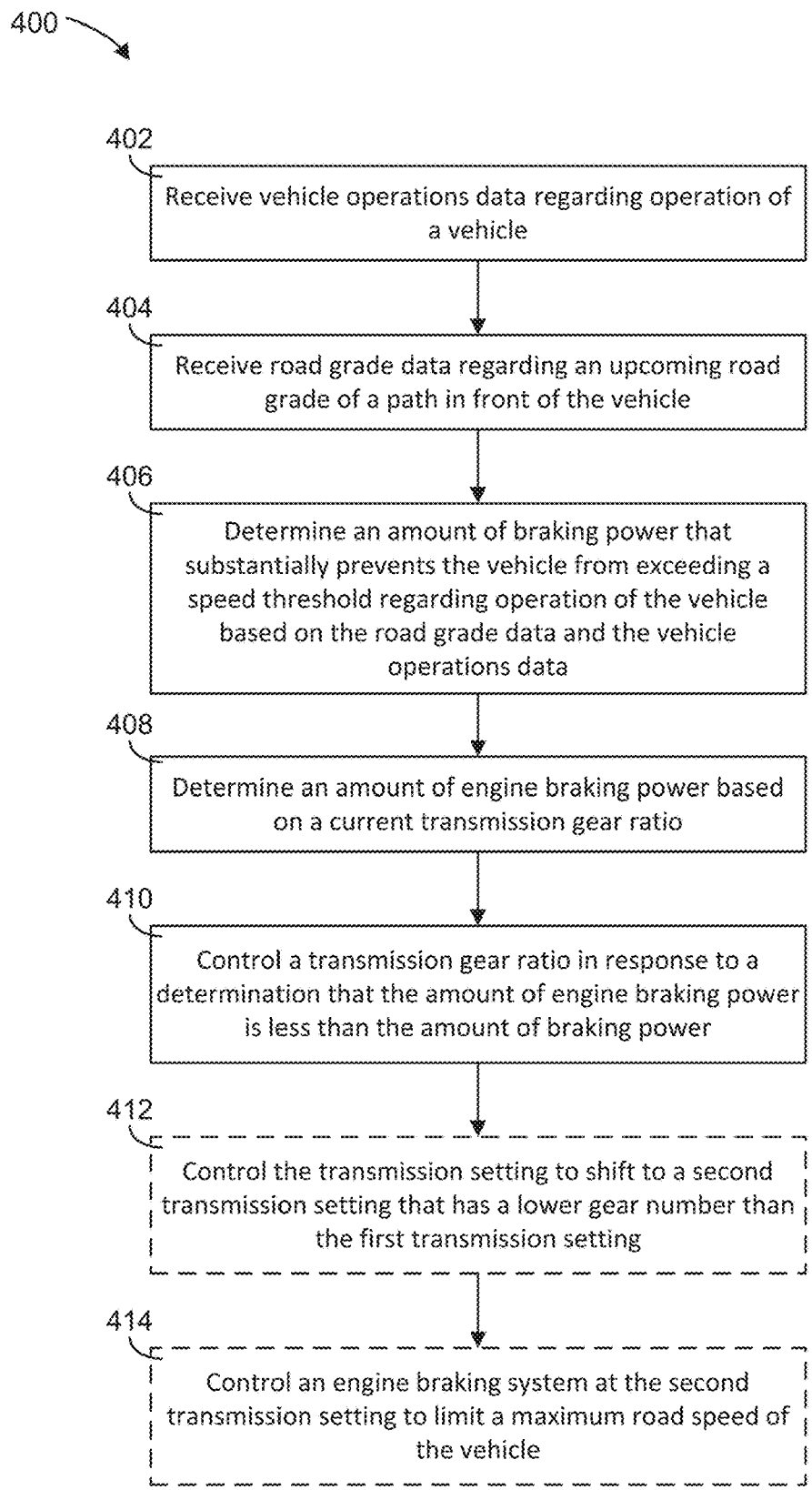
FIG. 4 is a flow diagram of a method of controlling a transmission and an engine braking system of a vehicle, according to an example embodiment.

Referring now to FIG. 4, a method 400 for controlling the transmission 102 and the engine braking system 106 to prevent road speed excursions while traversing a road grade event is shown, according to an example embodiment. In one example embodiment, the method 400 may be implemented with the vehicle 10 and the controller 150 of FIGS. 1-2. As such, the method 400 may be described with regard to FIGS. 1-2.

At 402, a controller (e.g., the controller 150, the vehicle operations circuit 158, etc.) receives vehicle operations data regarding operation of a vehicle (e.g., the vehicle 10, etc.). The vehicle operations data may include a current transmission gear ratio (e.g., the transmission gear ratio reported by the transmission control circuit 162, etc.), a maximum threshold road speed (e.g., a maximum threshold road speed prescribed by the operator via the operator I/O 130, etc.), a maximum threshold engine speed, a current engine speed from a sensor (e.g., sensor 140, etc.), vehicle weight and loading information, and other operations data.

At 404, the controller (e.g., the road grade monitoring circuit 156, etc.) receives road grade data regarding an upcoming road grade of a path in front (e.g., ahead) of the vehicle. The road grade data may include distance (e.g., distance from the current location of the vehicle) as a function of road grade for a plurality of road grade events. The road grade data may further include GPS and/or telematics data to identify a current position/location of the vehicle.

At 406, the controller (e.g., the engine braking control circuit 160) determines a required amount of braking power that substantially prevents the vehicle from exceeding a speed threshold regarding operation of the vehicle (e.g., an amount of power that prevents the vehicle from exceeding the maximum threshold road speed while traversing the upcoming road grade) based on the road grade data and the vehicle operations data. Process 406 may include calculating or otherwise determining (e.g., predicting) the powers (e.g., power terms) associated with the vehicle at different time intervals while traversing the road grade event and summing the contributions from each of the power terms at each time interval over the duration of the road grade event, as described with reference to the engine braking control circuit 160 of FIG. 2 above.

At 408, the controller determines an amount of engine braking power based on the current transmission gear ratio or setting. For example, the controller may access engine braking power vs. speed data to determine the braking power produced at an engine operating speed that corresponds to the maximum threshold road speed for the vehicle (e.g., 70 mph, 75 mph, etc.) as described with reference to FIG. 2 above. Process 408 may additionally include determining the engine operating speed that corresponds with the maximum threshold road speed at the current transmission gear ratio or setting.

At 410, the controller controls a transmission gear ratio or setting of the vehicle in response to a determination that the amount of engine braking power is less than the required amount of braking power. For example, the controller (e.g., via the engine braking control circuit 160) may compare the (predicted) amount of engine braking power than can be produced by the engine braking system at the current transmission gear ratio to the required amount of braking power. In a scenario where the amount of engine braking power that can be produced is greater than or equal to the required amount of braking power, the controller may be structured to command the transmission (e.g., via the transmission control circuit 162) to maintain the current transmission gear ratio. In a scenario where the amount of engine braking power that can be produced is less than the required amount of braking power, the controller may be structured to command the transmission to shift to a second transmission gear ratio that has a lower gear number than the first transmission ratio, at 412. The method 400 is shown to further include process 414 in which the controller controls the engine braking system at either the current transmission gear ratio/setting or the second transmission gear ratio/setting to limit a maximum road speed of the vehicle below the maximum threshold road speed while traversing the road grade event. Process 414 may include applying the engine brakes (e.g., via the engine braking system 106) to slow the vehicle at or above a lower droop (e.g., a minimum braking speed for the vehicle, an upper threshold road speed at which the cruise control system may function independently without engine braking) for the cruise control system.

Figure 5:
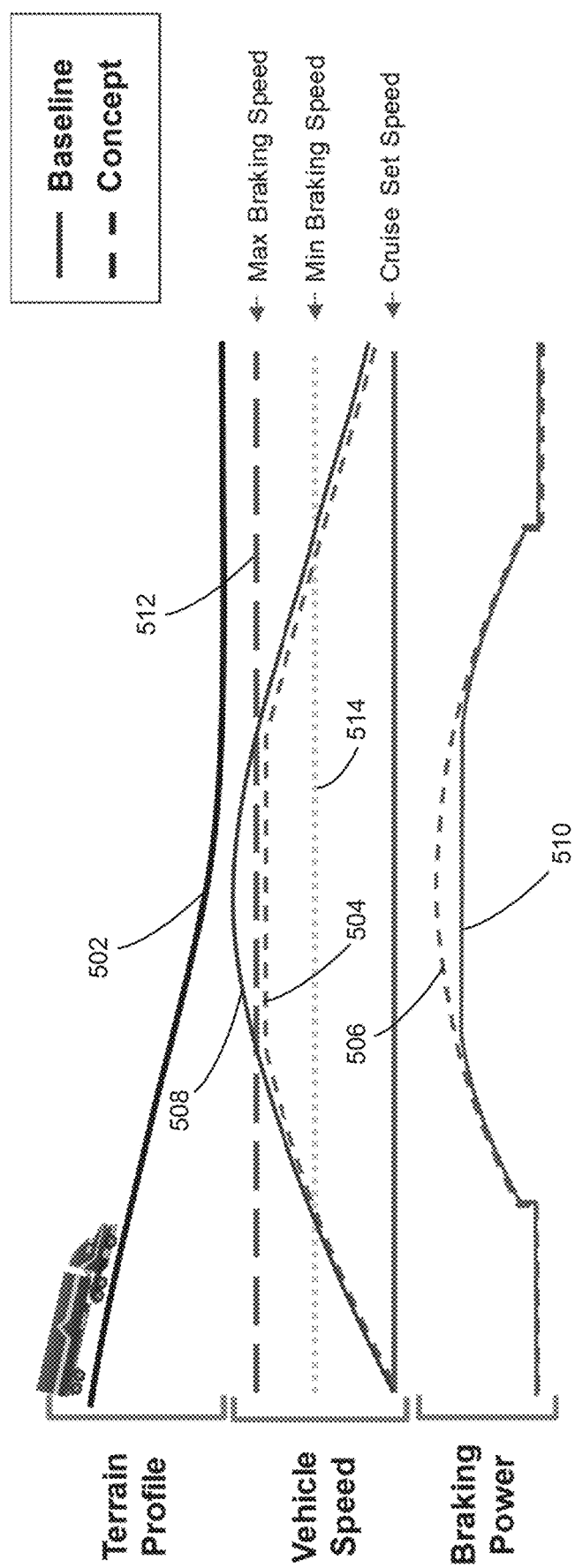
FIG. 5 is a graph showing an engine braking control approach, according to an example embodiment.

FIG. 5 shows a graph of vehicle performance while traversing a road grade (e.g., a single road grade event, downward slope, etc.), according to a first example embodiment. Curve 502 shows the profile (e.g., road grade) of the terrain ahead of the vehicle. The dashed curves 504 and 506 show the road speed of the vehicle and the engine braking power applied by the engine braking system to slow the vehicle, respectfully, while traversing the road grade event. As shown in FIG. 5, during an initial portion of the decent (or just prior to the initial portion), the controller determines, as indicated by the solid curves 508 and 510, that the current transmission ratio is insufficient to prevent a road speed excursion beyond the maximum threshold road speed 512. The controller then commands the transmission to shift to the second transmission gear ratio to provide additional engine braking power during the descent. As shown in FIG. 5, once the road speed of the vehicle exceeds the lower droop 514 for the cruise control system, the controller activates the engine braking system. The controller gradually increases the engine braking power to a maximum braking power to maximize operator comfort (e.g., to prevent hard or jerky braking). The controller may vary the engine braking power at a single transmission setting by modifying the timing of the exhaust valve(s). The engine braking power provided by the engine braking system at the second transmission gear ratio is sufficient to prevent the vehicle from exceeding the maximum road speed threshold. As the vehicle slows, toward a lower portion of the descent, the engine braking power is gradually reduced. The controller disables the engine braking system once the road speed drops below the lower droop 514.

Figure 6:
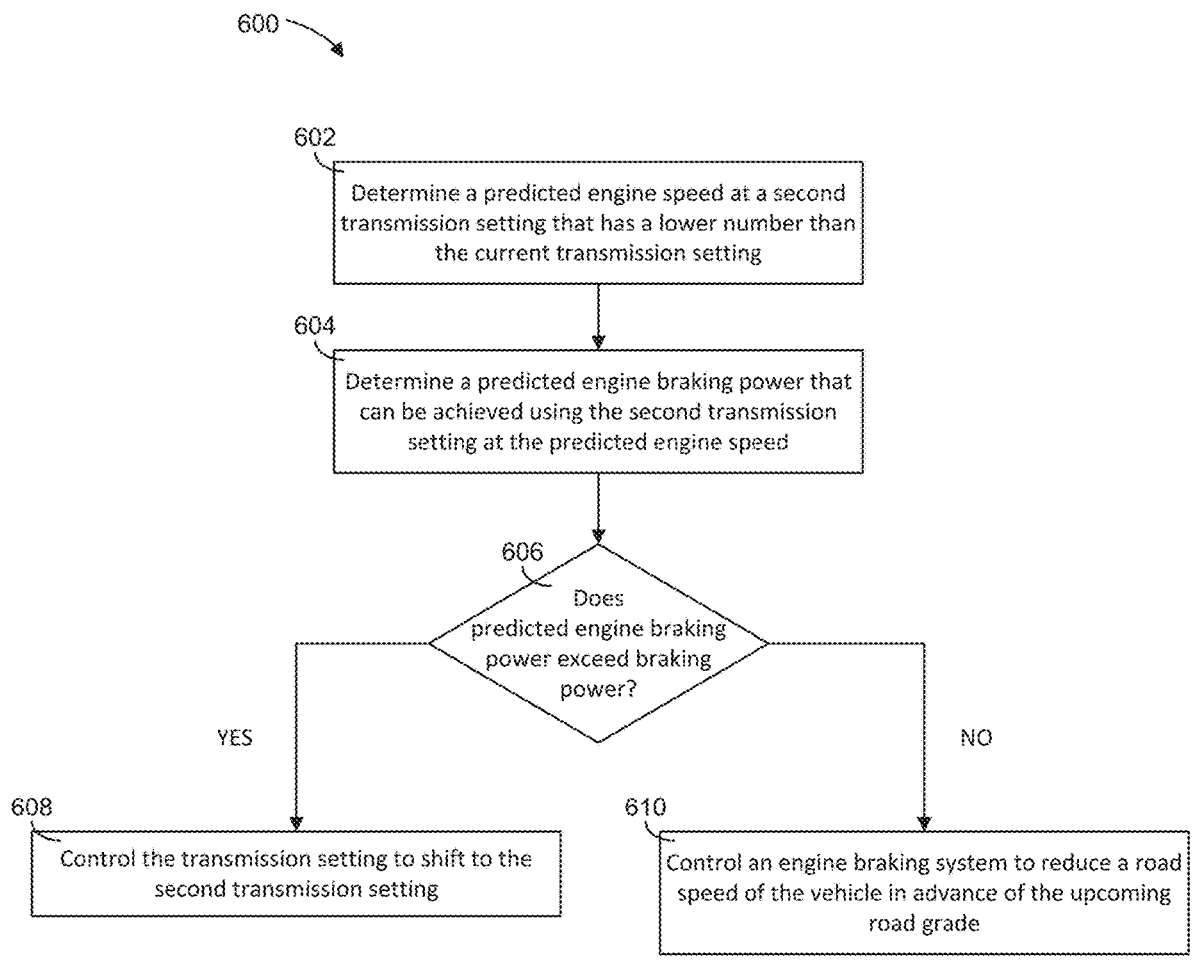
FIG. 6 is a flow diagram of a method of controlling a transmission gear ratio of a vehicle, according to an example embodiment.

It will be appreciated that the control algorithm may be modified in various ways to improve braking performance and/or fuel efficiency of the engine. Referring now to FIG. 6, a method 600 of controlling the transmission and the engine braking system is shown, according to another example embodiment. In some embodiments, the method 600 of FIG. 6 may be incorporated as part of the method 400 of FIG. 4 (as additional processes performed in the method 400 of FIG. 4). At 602, the controller determines a predicted engine speed at a second transmission gear ratio (i.e., setting) that has a lower gear number than the current transmission gear ratio. Process 602 may include determining a predicted engine speed at a plurality of transmission gear ratios (e.g., a third transmission gear ratio, a fourth transmission gear ratio, etc.). Further, the predicted engine speed may be determined as a function of the maximum threshold road speed. For example, based on experimental data, a look up table may be established that correlates various road speeds to engine speeds. Thus, at various upcoming route locations and based on the maximum threshold road speed, a predicted engine speed at that location for that threshold road speed may be determined. At 604, the controller determines a predicted engine braking power that can be achieved using the second transmission gear ratio at the predicted engine speed. Alternatively, or in combination, process 604 may include determining a predicted engine braking power that can be achieved using each of the plurality of different transmission gear ratios. Processes 602 and 604 may include performing operations similar to those described with reference to the engine braking control circuit 160 of FIG. 2.

The method 600 includes comparing the predicted engine braking power (e.g., for at least one transmission gear ratio) to the braking power required to prevent the vehicle from over accelerating while traversing the road grade, at 606. In a scenario where the predicted engine braking power exceeds the required braking power, the method 600 proceeds to 608 and the controller commands a transmission gear ratio change to the second transmission gear ratio. In a scenario where the predicted engine braking power at each one of the transmission gear ratios is less than the required braking power, the method 600 proceeds to 610. At 610, the controller controls the engine braking system to reduce a road speed of the vehicle in advance of the upcoming road grade event. In other words, the controller modifies the engine operating speed such that the road grade event may be navigated with sufficient engine braking power margin to prevent road speed excursions.

Process 610 may include determining by the controller a predicted over speed (e.g., a difference between a maximum predicted road speed and the maximum threshold speed) based on a difference between the predicted engine braking power and the required amount of braking power. Additionally, process 610 may include controlling the engine braking system based on the predicted over speed as further described with reference to the engine braking control circuit 160 of FIG. 2. Process 610 may further include repeatedly determining, by the controller, the predicted over speed for a plurality of different road grade event (e.g., descent) entry speeds, and activating the engine braking system to reduce the road speed to the entry speed that minimizes the over speed. In some embodiments, process 610 may additionally include disabling the cruise control system (e.g., disabling droops) for a predefined time period, or while the vehicle is traversing the road grade.

Figure 7:
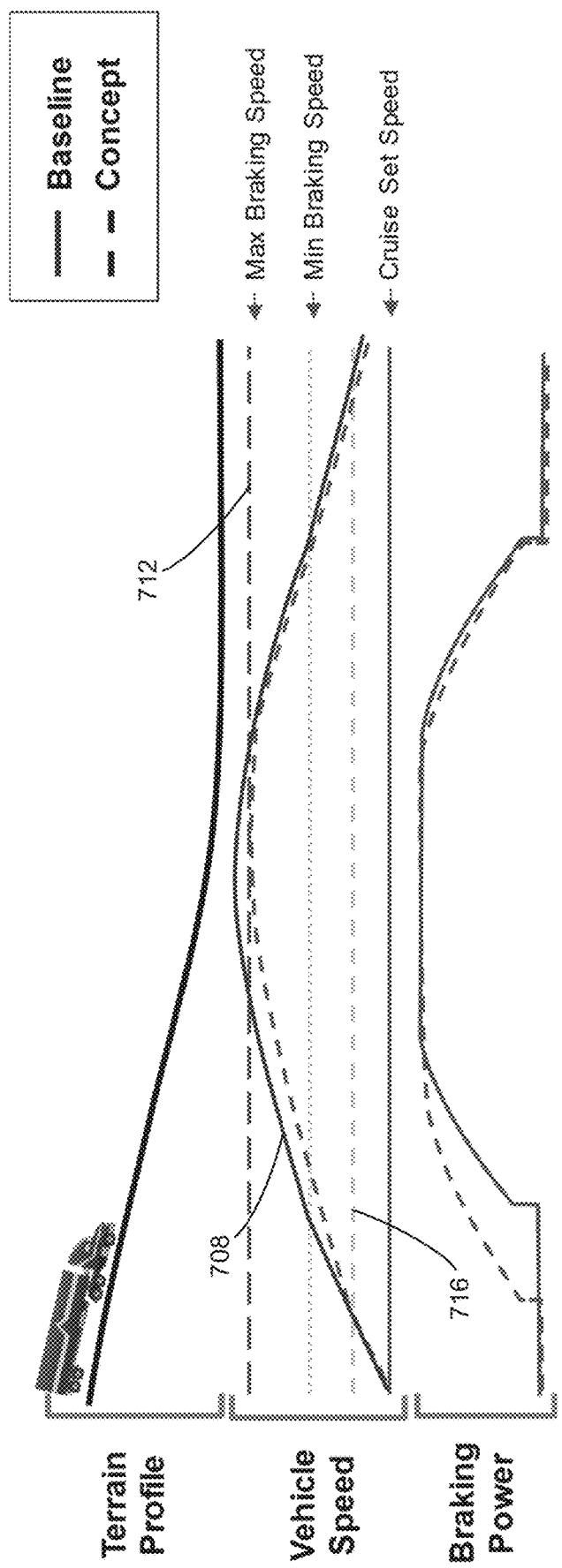
FIG. 7 is a graph showing an engine braking control approach, according to another example embodiment.

Referring now to FIG. 7, a graph of vehicle performance while traversing a road grade (e.g., a single road grade event, downward slope, etc.) is shown according to a second example embodiment. As indicated by the solid curve 708, the predicted engine braking power provided by the engine at, for example, a second transmission gear ratio remains insufficient to prevent a road speed excursion (e.g., a road speed above the maximum threshold road speed 712). The controller therefore activates the engine braking system in advance of the upcoming road grade, which may also include an upper portion of the descent. The position along the upper portion at which the engine brakes are activated is indicated by the dashed horizontal line 716.

Figure 8:
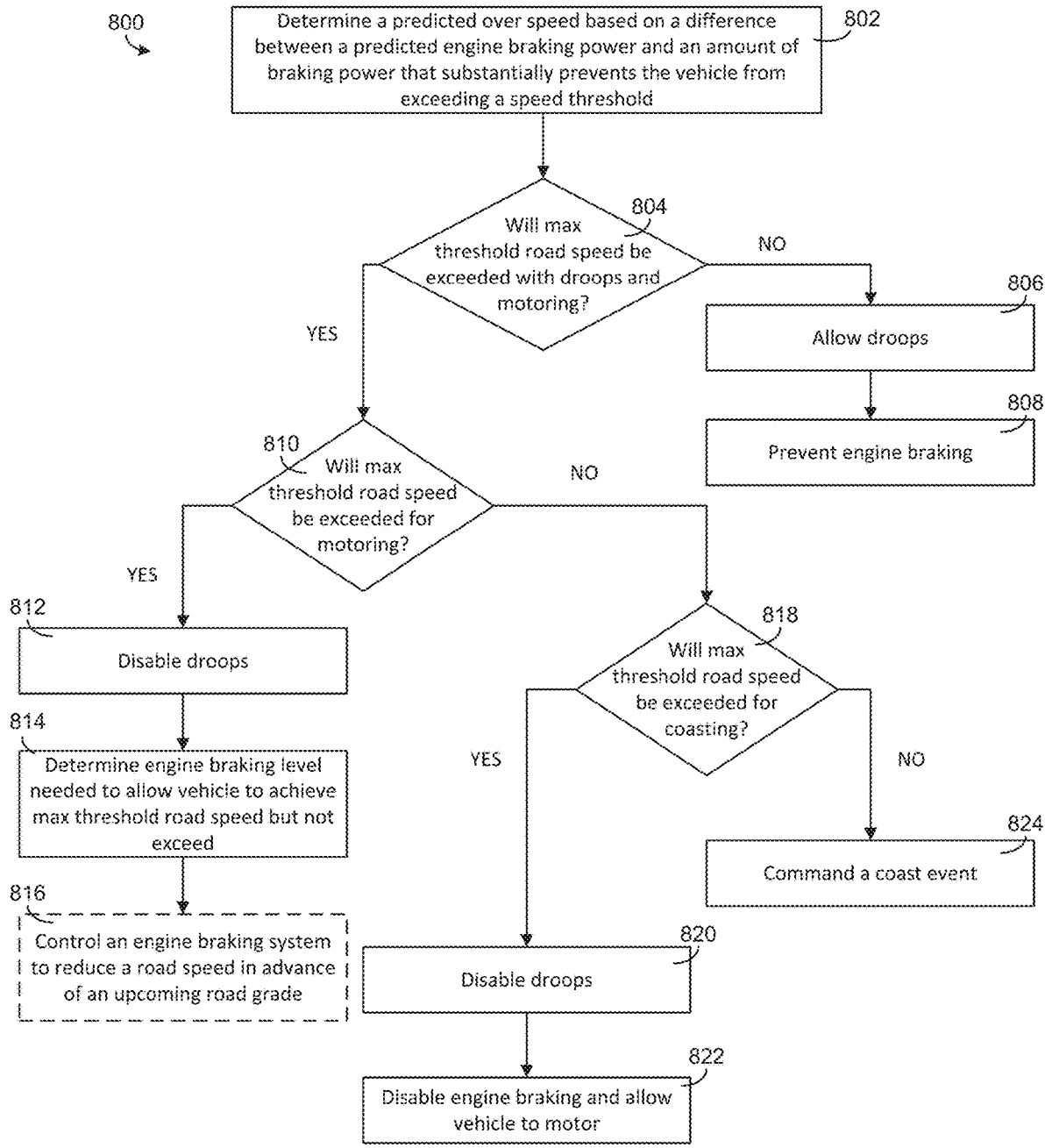
FIG. 8 is a flow diagram of a method of controlling an engine braking system of a vehicle to prevent road speed excursions, according to an example embodiment.

The methods described herein may be modified or adapted to include additional functionality to improve vehicle performance and/or fuel efficiency. Referring now to FIG. 8, a method 800 of controlling an engine braking system, a transmission, and a cruise control system (to prevent road speed excursions) is shown according to an example embodiment. The method 800 illustrates a combined control strategy (e.g., logic) that may be implemented, for example, by the engine braking control circuit 160 of FIG. 2. At 802, the controller determines a predicted over speed based on a difference between a predicted engine braking power that can be provided at a given transmission setting and a required amount of braking power. At 804, the controller determines whether the maximum threshold road speed will be exceeded by the vehicle when using a combination of droops and motoring (e.g., without engine braking). For gradual road grades, where the maximum threshold road speed will not be exceeded (while the transmission is engaged), the method 800 proceeds to process 806 and 808 in which the vehicle proceeds to operate without the application of engine braking (e.g., allowing droops in the cruise control system and disabling or otherwise preventing engine braking).

For steep grades and/or for very gradual grades (e.g., where motoring is either insufficient to prevent road speed excursions or where motoring will actually slow the vehicle down below the upper droop during the descent), the method 800 proceeds to process 810. At 810, the controller determines whether the maximum threshold road speed will be exceeded for motoring alone (e.g., with the droops for the cruise control system deactivated/disabled). In a scenario where the controller predicts that the maximum threshold road speed will be exceeded, the method 800 proceeds to process 812-816. At 812, the droops for the cruise control system are disabled, thereby preventing the vehicle from inadvertently increasing road speed during the descent. Such action may be particularly useful in situations where the road speed of the vehicle needs to be reduced below an upper droop in advance of the road grade. At 812, the controller determines the engine braking level needed to allow the vehicle to achieve but not exceed the maximum threshold speed during the descent. If engine braking alone is not sufficient, the method 800 proceeds to optional process 814 in which the controller controls the engine braking speed to reduce the road speed of the vehicle in advance of the upcoming road grade.

Returning to process 810, in a scenario where the controller predicts that the maximum threshold road speed will not be exceeded for motoring alone, the method 800 proceeds to process 818. At 818, the controller determines whether the maximum threshold road speed will be exceeded for coasting alone (e.g., no motoring, with the transmission disengaged from the powertrain). In a scenario where the controller determines that the maximum threshold road speed will be exceeded for coasting alone, the method proceeds to processes 820-822, and the vehicle is allowed to motor with the transmission engaged, but without droops (e.g., with droops for the cruise control system disabled). Among other benefits, motoring without droops prevents the cruise control system from applying throttle or fuel to the engine while descending the road grade, which may be an issue, for example, in a scenario where the road grade starts out gradual but becomes much steeper later on. In a scenario where the controller determines that the maximum threshold road speed will not be exceeded for coasting alone, the method proceeds to process 824, and the vehicle is allowed to coast and thereby conserve the additional momentum provided by the road grade event.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIG. 2, it should be understood that the controller 150 may include any number of circuits for completing the functions described herein. For example, the activities and functionalities of the road grade monitoring circuit 156, the vehicle operations circuit 158, the engine braking control circuit 160, the transmission control circuit 162, and/or the cruise control circuit 164 may be combined in multiple circuits or as a single circuit. Additional circuits with additional functionality may also be included. Further, it should be understood that the controller 150 may further control other activity beyond the scope of the present disclosure.

As mentioned above and in one configuration, the "circuits" may be implemented in machine-readable medium for execution by various types of processors, such as processor 152 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of substantially preventing road speed excursions while traversing a road grade, the method comprising:
determining, by a controller, a predicted over speed for a vehicle during an upcoming downhill grade based on a difference between a predicted engine braking power of the vehicle and an amount of braking power that substantially prevents a speed of the vehicle from exceeding a speed threshold; and
responsive to the determination, controlling, by the controller, one or more components of the vehicle to substantially prevent the vehicle from exceeding the speed threshold.

2. The method of claim 1, responsive to the determination that the predicted over speed of the vehicle is within an acceptable range of the speed threshold, the controlling the one or more components further comprises:
allowing, by the controller, vehicle speed droops during a cruise control operating mode of the vehicle; and
disengaging, by the controller, an engine braking system of the vehicle.

3. The method of claim 1, responsive to the determination that the predicted over speed of the vehicle is greater than the speed threshold value, the controlling the one or more components further comprises:
disabling, by the controller, vehicle speed droops during a cruise control operating mode of the vehicle; and determining, by the controller, that the speed threshold is expected to be exceeded by the speed of the vehicle during an upcoming downhill grade for the vehicle.

4. The method of claim 3, responsive to the determination that the speed threshold is expected to be exceeded during the upcoming downhill grade, the controlling the one or more components further comprises:
controlling, by the controller, an engine braking system of the vehicle to generate or substantially generate the amount of braking power that substantially prevents the speed of the vehicle from exceeding the speed threshold during the upcoming downhill grade.

5. The method of claim 3, responsive to the determination that the speed threshold is expected to be exceeded during the upcoming downhill grade, the controlling the one or more components further comprises:
determining, by the controller, that the speed threshold is expected to be exceeded by the speed of the vehicle during the upcoming downhill grade based on a transmission of the vehicle being disengaged.

6. The method of claim 5, responsive to the determination that the speed threshold is expected to be exceeded by the speed of the vehicle during the upcoming downhill grade based on the transmission being disengaged, the controlling the one or more components further comprises:
disabling, by the controller, an engine braking system of the vehicle.

7. The method of claim 5, responsive to the determination that the speed of the vehicle is expected to exceed the speed threshold during the upcoming downhill grade based on the transmission being disengaged, the controlling one or more components further comprises:
disengaging, by the controller, the transmission.

8. A system, comprising:
a controller comprising a processing circuit having a processor coupled to a memory storing instructions that, when executed by the processing circuit, cause the processing circuit to perform operations for substantially preventing road speed excursions while traversing a road grade, the operations comprising:
determine an over speed for a vehicle during an upcoming grade based on a difference between a determined engine braking power of the vehicle and an amount of braking power that substantially prevents a speed of the vehicle from exceeding a speed threshold; and
responsive to the determination, control one or more components of the vehicle to substantially prevent the vehicle from exceeding the speed threshold.

9. The system of claim 8, responsive to the determination that the over speed of the vehicle is within an acceptable range of the speed threshold, the control of the one or more components further comprises:
allow vehicle speed droops during a cruise control operating mode of the vehicle; and
disengage an engine braking system of the vehicle.

10. The system of claim 8, responsive to the determination that the over speed of the vehicle is greater than the speed threshold value and the upcoming grade, the control of the one or more components further comprises:
disable vehicle speed droops during a cruise control operating mode of the vehicle; and
determine that the speed threshold is expected to be exceeded by the speed of the vehicle during the upcoming grade for the vehicle.

11. The system of claim 10, responsive to the determination that the speed threshold is expected to be exceeded during the upcoming grade, the control of the one or more components further comprises:
control an engine braking system of the vehicle to generate or substantially generate the amount of braking power that substantially prevents the speed of the vehicle from exceeding the speed threshold during the upcoming grade.

12. The system of claim 10, wherein the control of the one or more components further comprises:
determine that the speed threshold is expected to be exceeded by the speed of the vehicle during the upcoming grade based on a transmission of the vehicle being disengaged.

13. The system of claim 12, responsive to the determination that the speed threshold is expected to be exceeded by the speed of the vehicle during the upcoming grade based on the transmission being disengaged, the control of the one or more components further comprises:
disable an engine braking system of the vehicle.

14. The system of claim 12, responsive to the determination that the speed of the vehicle is expected to exceed the speed threshold during the upcoming grade based on the transmission being disengaged:
disengage the transmission.

15. A non-transitory computer readable medium having computer-executable instructions embodied therein that, when executed by a computing system, causes the computing system to perform operations for substantially preventing road speed excursions while traversing a road grade, the operations comprising:
determining an over speed for a vehicle during an upcoming grade on a path of the vehicle based on a difference between a determined engine braking power of the vehicle and an amount of braking power that substantially prevents a speed of the vehicle from exceeding a speed threshold; and
responsive to the determination, controlling one or more components of the vehicle to substantially prevent the vehicle from exceeding the speed threshold.

16. The computer readable medium of claim 15, responsive to the determination that the determined over speed of the vehicle is within an acceptable range of the speed threshold, the controlling the one or more components further comprises:
allowing vehicle speed droops during a cruise control operating mode of the vehicle; and
disengaging an engine braking system of the vehicle.

17. The computer readable medium of claim 15, responsive to the determination that the determined over speed of the vehicle is greater than the speed threshold value and the upcoming grade, controlling the one or more components further comprises:
disabling vehicle speed droops during a cruise control operating mode of the vehicle; and
determining that the speed threshold is expected to be exceeded by the speed of the vehicle during the upcoming grade for the vehicle.

18. The computer readable medium of claim 17, responsive to the determination that the speed threshold is expected to be exceeded during the upcoming grade, the controlling the one or more components further comprises:
controlling an engine braking system of the vehicle to generate or substantially generate the amount of braking power that substantially prevents the speed of the vehicle from exceeding the speed threshold during the upcoming grade.

19. The computer readable medium of claim 17, responsive to the determination that the speed threshold is expected to be exceeded during the upcoming grade, the controlling one or more components further comprises:
   determining that the speed threshold is expected to be exceeded by the speed of the vehicle during the upcoming grade based on a transmission of the vehicle being disengaged.

20. The computer readable medium of claim 19, responsive to the determination that the speed threshold is expected to be exceeded by the speed of the vehicle during the upcoming grade based on the transmission being disengaged, the controlling the one or more components further comprises:
   disabling an engine braking system of the vehicle.

* * * * *